(12) United States Patent
Arnold et al.

(10) Patent No.: US 10,001,238 B2
(45) Date of Patent: Jun. 19, 2018

(54) REPAIR OF PIPES

(71) Applicant: Fyfe Co. LLC, San Diego, CA (US)

(72) Inventors: Scott Arnold, Solana Beach, CA (US); Tomas Jimenez, San Diego, CA (US); Nikolas DeLetto, Escondido, CA (US)

(73) Assignee: Fyfe Co. LLC, San Diego, CA (US)

( * ) Notice: Subject to any disclaimer, the term of this patent is extended or adjusted under 35 U.S.C. 154(b) by 48 days.

(21) Appl. No.: 14/740,811

(22) Filed: Jun. 16, 2015

(65) Prior Publication Data

US 2015/0362115 A1 Dec. 17, 2015

Related U.S. Application Data

(60) Provisional application No. 62/012,762, filed on Jun. 16, 2014.

(51) Int. Cl.
| | |
|---|---|
| *F16L 55/05* | (2006.01) |
| *F16L 55/1645* | (2006.01) |
| *F16L 55/162* | (2006.01) |

(52) U.S. Cl.
CPC .......... *F16L 55/1645* (2013.01); *F16L 55/162* (2013.01)

(58) Field of Classification Search
CPC .............................. F16L 55/1645; F16L 55/162
USPC .......... 138/97, 98, DIG. 2; 405/150.1, 184.2
See application file for complete search history.

(56) References Cited

U.S. PATENT DOCUMENTS

| | | | |
|---|---|---|---|
| 3,459,014 A | 8/1969 | Beming | |
| 3,520,749 A | 7/1970 | Rubenstein | |
| 4,009,063 A | 2/1977 | Wood | |
| 4,836,715 A | 6/1989 | Wood | |
| 4,976,290 A | 12/1990 | Gelin et al. | |
| 5,049,003 A | 9/1991 | Barton | |
| 5,077,107 A | 12/1991 | Kaneda et al. | |
| 5,168,006 A | 12/1992 | Inoguchi et al. | |
| 5,218,810 A | 6/1993 | Isley, Jr. | |
| 5,271,433 A | 12/1993 | Schwert et al. | |

(Continued)

FOREIGN PATENT DOCUMENTS

| | | |
|---|---|---|
| DE | 2753669 A1 | 10/1978 |
| DE | 4403370 A1 | 8/1995 |

(Continued)

OTHER PUBLICATIONS

Trenchless Technology, CIPP of Leaking High-Pressure Gas main, Oct. 2011, 4 pages.

(Continued)

*Primary Examiner* — Craig Schneider
*Assistant Examiner* — David Deal
(74) *Attorney, Agent, or Firm* — Senniger Powers LLP (57) ABSTRACT

A method of repairing a section of a pipe including a breach in the pipe. A surface of a wall of the pipe is prepared generally around the breach. A piece of conformable material of the type capable of carrying a curable polymer is sized in relation to a size of the breach. The sized piece of conformable material is applied to the prepared surface so that the breach is covered by the piece of conformable material. The piece of conformable material is impregnated with a curable polymer. The curable polymer is cured within the piece of conformable material thereby to seal the breach against egress of groundwater into the pipe.

11 Claims, 4 Drawing Sheets

(56) References Cited

U.S. PATENT DOCUMENTS

| | | | |
|---|---|---|---|
| D343,628 S | 1/1994 | Sciholtz | |
| 5,322,653 A | 6/1994 | Muller | |
| 5,334,429 A | 8/1994 | Imoto et al. | |
| D358,599 S | 5/1995 | Dietterich et al. | |
| 5,423,630 A | 6/1995 | Imoto et al. | |
| 5,549,856 A | 8/1996 | Yokoshima | |
| 5,593,700 A | 1/1997 | Stilgenbauer | |
| 5,649,398 A | 7/1997 | Isley, Jr. et al. | |
| 5,683,530 A | 11/1997 | Fawley et al. | |
| 5,931,198 A | 8/1999 | Raji et al. | |
| 5,971,030 A | 10/1999 | Maimets | |
| 6,019,136 A | 2/2000 | Walsh et al. | |
| 6,027,783 A | 2/2000 | Wagener | |
| 6,042,668 A | 3/2000 | Kamiyama et al. | |
| 6,146,491 A | 11/2000 | Wood et al. | |
| 6,360,780 B1 * | 3/2002 | Adolphs | F16L 55/1656 138/130 |
| 6,508,276 B2 | 1/2003 | Rädlinger et al. | |
| 6,615,875 B2 | 9/2003 | Adolphs et al. | |
| 6,668,596 B1 | 12/2003 | Wagener | |
| 6,732,763 B2 | 5/2004 | Williamson et al. | |
| 6,679,966 B1 | 6/2004 | Brandenburger | |
| 7,000,645 B2 | 2/2006 | Glejbøl et al. | |
| 7,018,691 B2 | 3/2006 | McNeil | |
| 7,096,890 B2 | 8/2006 | Woolstencroft et al. | |
| 7,261,788 B1 | 8/2007 | Driver | |
| D568,347 S | 5/2008 | Manera et al. | |
| 7,478,650 B2 | 1/2009 | Pleydon et al. | |
| 7,478,659 B2 | 1/2009 | Pleydon et al. | |
| 7,708,033 B2 | 5/2010 | Tanaka et al. | |
| 7,727,447 B2 | 6/2010 | Song et al. | |
| 7,858,189 B2 | 12/2010 | Wagener et al. | |
| 7,891,381 B2 | 2/2011 | Anders et al. | |
| 7,938,146 B2 * | 5/2011 | Brooks | F16L 55/1683 138/97 |
| D643,445 S | 8/2011 | Harrison | |
| 7,997,115 B2 | 8/2011 | Tidl et al. | |
| D646,700 S | 10/2011 | Takeuchi | |
| 8,047,238 B2 | 11/2011 | Wiessner et al. | |
| D658,689 S | 5/2012 | Li | |
| 8,375,972 B2 | 2/2013 | Kiest, Jr. | |
| 8,590,575 B2 | 11/2013 | D'Hulster | |
| D696,317 S | 12/2013 | Carper | |
| 8,616,243 B2 | 12/2013 | Kiest, Jr. | |
| D700,224 S | 2/2014 | Kmoch et al. | |
| 8,978,708 B2 | 3/2015 | Brandenburger et al. | |
| D733,198 S | 6/2015 | Chappel | |
| 9,052,053 B2 | 6/2015 | Kiest | |
| 9,222,611 B2 | 12/2015 | Colasanto | |
| 9,248,605 B2 | 2/2016 | Quitter | |
| D764,554 S | 8/2016 | Charles et al. | |
| 9,435,468 B2 | 9/2016 | Graham | |
| 2002/0124898 A1* | 9/2002 | Renaud | F16L 55/1651 138/98 |
| 2003/0066567 A1 | 4/2003 | Manners | |
| 2003/0113489 A1 | 6/2003 | Smith | |
| 2003/0138298 A1 | 7/2003 | Mercier | |
| 2003/0234057 A1 | 12/2003 | Woolstencroft et al. | |
| 2004/0149341 A1 | 8/2004 | Driver | |
| 2004/0258479 A1 | 12/2004 | Manners | |
| 2005/0028880 A1 | 2/2005 | Smith | |
| 2005/0028881 A1 | 2/2005 | Smith et al. | |
| 2006/0118028 A1* | 6/2006 | Schroeder | B63B 5/24 114/355 |
| 2006/0124188 A1 | 6/2006 | Catha et al. | |
| 2007/0074774 A1 | 4/2007 | Chandler | |
| 2007/0267785 A1 | 11/2007 | Bellamy et al. | |
| 2008/0277013 A1 | 11/2008 | Anders et al. | |
| 2009/0116927 A1 | 5/2009 | Keenan et al. | |
| 2009/0308475 A1 | 12/2009 | Stringfellow et al. | |
| 2009/0314409 A1 | 12/2009 | Ehsani | |
| 2010/0078118 A1* | 4/2010 | Ehsani | B29C 63/28 156/94 |
| 2010/0212803 A1 | 8/2010 | Carr et al. | |
| 2012/0291903 A1 | 11/2012 | Ekelund et al. | |
| 2013/0074972 A1 | 3/2013 | Fuechtjohann et al. | |
| 2013/0280477 A1* | 10/2013 | Davis | B32B 5/12 428/109 |
| 2014/0034175 A1 | 2/2014 | Fyfe | |
| 2014/0116557 A1 | 5/2014 | Bichler | |
| 2014/0116566 A1 | 5/2014 | Bader et al. | |
| 2015/0045527 A1 | 2/2015 | Schleicher et al. | |
| 2015/0246501 A1 | 9/2015 | Den Besten et al. | |
| 2016/0033072 A1 | 2/2016 | Mersmann et al. | |

FOREIGN PATENT DOCUMENTS

| | | |
|---|---|---|
| DE | 19941669 A1 | 3/2001 |
| EP | 0510784 A1 | 10/1992 |
| EP | 2390547 A2 | 11/2001 |
| EP | 2273171 A1 | 1/2011 |
| EP | 2722157 A1 | 4/2014 |
| JP | H02219635 | 9/1990 |
| JP | H0350280 A | 3/1991 |
| JP | H03292127 A | 12/1991 |
| JP | S5262379 | 5/1997 |
| JP | 2007518608 A | 7/2007 |
| WO | 2012145422 A1 | 10/2012 |
| WO | 2013163736 A1 | 5/2013 |
| WO | 2014110544 A1 | 7/2014 |

OTHER PUBLICATIONS

Trenchless Technology, Trenchless Lateral Repair Keeps Oregon Landscape Untouched, Apr. 2012, 2 pages.

Vectorply(R) Performance Composite Reinforcements, product sheet E-LTM 3610, Vectorply(R) Corporation, Rev. May 3, 2011.

Vectorply(R) Performance Composite Reinforcements, product sheet E-BX 1200, Vectorply(R) Corporation, Rev. May 3, 2011.

Vectorply(R) Performance Composite Reinforcements, product sheet E-TLX 2400, Vectorsports(TM), Vectorply(R) Corporation, Rev. May 3, 2011.

Vectorply(R) Performance Composite Reinforcements, product sheet E-QX 4800, Laborsaver(TM), Vectorply(R) Corporation, Rev. May 3, 2011.

Vectorply(R) Performance Composite Reinforcements, product sheet E-LM 3610, Laborsaver(TM), Vectorply(R) Corporation, Rev. May 3, 2011.

Vectorply(R) Performance Composite Reinforcements, product sheet E-TLX 2200, Vectorsports(TM), Vectorply(R) Corporation, Rev. May 3, 2011.

Vectorply(R) Performance Composite Reinforcements, product sheet E-BXM 1708, Vectorply(R) Corporation, Rev. May 3, 2011.

Vectorply(R) Performance Composite Reinforcements, product sheet E-BX 1700, Vectorply(R) Corporation, Rev. May 3, 2011.

Vectorply(R) Performance Composite Reinforcements, product sheet E-QXCFM 3510, Vectorfusion(TM) Infusion Specific Reinforcements, Vectorply(R) Corporation, Rev. May 3, 2011.

Vectorply(R) Performance Composite Reinforcements, product sheet E-BXCFM 1710, Vectorfusion(TM), Infusion-Specific Reinforcements, Vectorply(R) Corporation, Rev. May 3, 2011.

Rongxing Zhou, An Improved MWK Structure for Composite Reinforcement, Textile Research Journal, Published by Sage, Apr. 1, 2005.

Fyfe(R) an Aegion Company, Tyfo(R) Fibrwrap(R) Composite Systems, 3 pages, Copyright 2013 Fyfe Co., LLC (admitted prior art).

Pipelines 2014: From Underground to the Forefront of Innovation and Sustainability; Fifteen Years of Lessons Learned . . . ; (C) ASCE 2014, 14 pages.

Fyfe Co. LLC, Tyfo(R) Web Composite using Tyfo(R) S Epoxy, 2 pages, Copyright 2005-2012 Fyfe Co. LLC 23-12.

Written Opinion of related application No. PCT/IB2015/054554, 5 pages dated Oct. 13, 2015.

Search Report of related application No. PCT/IB2015/054554, 5 pages dated Oct. 13, 2015.

(56) References Cited

OTHER PUBLICATIONS

Tube Forming System consisting of four photographs and description, admitted as prior art, 5 pages.

* cited by examiner

REPAIR OF PIPES

CROSS REFERENCE TO RELATED APPLICATIONS

The present application claims priority to U.S. Provisional Patent Application Ser. No. 62/012,762, entitled REPAIR OF PIPES, which is hereby incorporated by reference into the present disclosure.

BACKGROUND

The present disclosure relates generally to the repair of pipes and more particularly to methods and systems for pipe repair in which holes in the pipe are patched.

Over time or because of a particular event or condition (e.g., seismic activity, exposure to excessive or uneven loads or moments, exposure to micro-organisms, poor compaction, crown corrosion, corrosive soil, etc.), the structural integrity or capacity of force mains, other pipes and other structures may diminish. For example, such items may crack, corrode, deteriorate and the like. Different methods of repairing or otherwise strengthening damaged pipes and other items are well-known. For example, liners or sheets made of fiber reinforced polymers can be attached to one or more portions of a pipe interior. Among other ways, liners of this type can be formed in a tubular shape and dragged in or everted into the pipe to be repaired. Still further, in larger diameter pipes, the lining may be formed by manually adhering sheets of repair material to the walls of the pipe.

Repair of buried or underground pipes in the manner described is hindered by groundwater infiltration. In many instances repair cannot proceed until groundwater infiltration is halted, at least temporarily. The conventional solution for metal pipes was to use welding to block holes or openings in the pipe (e.g., cracks or voids in the pipe side wall) that were allowing groundwater infiltration. However, this process is very time consuming and expensive. Other methods, such as simply stuffing material (e.g. pieces of wood, grout, gels or adhesives without any reinforcement) into pipe openings are unreliable.

SUMMARY

In one aspect, a method of repairing a section of a pipe including a breach in the pipe comprises preparing a surface of a wall of the pipe generally around the breach. A piece of conformable material of the type capable of carrying a curable polymer is sized in relation to a size of the breach. The sized piece of conformable material is applied to the prepared surface so that the breach is covered by the piece of conformable material. The piece of conformable material is impregnated with a curable polymer. The curable polymer is cured within the piece of conformable material thereby to seal the breach against egress of groundwater into the pipe.

In another aspect, a repaired pipe having a breach in the side wall closed by the repair comprises a conditioned surface around the breach. Adhesive is applied to the conditioned surface. A piece of fiber reinforced polymer material is cured over the breach and joined to the side wall of the pipe at least in part by the adhesive. The piece of fiber reinforced polymer material seals the breach against egress of groundwater into the pipe. The piece of reinforced polymer material is sized to cover the breach.

Other aspects and features will also be apparent in view of the included drawings, description, and claims.

BRIEF DESCRIPTION OF THE DRAWINGS

Corresponding reference characters indicate corresponding parts throughout the several views of the drawings.

DETAILED DESCRIPTION

Figure 1:
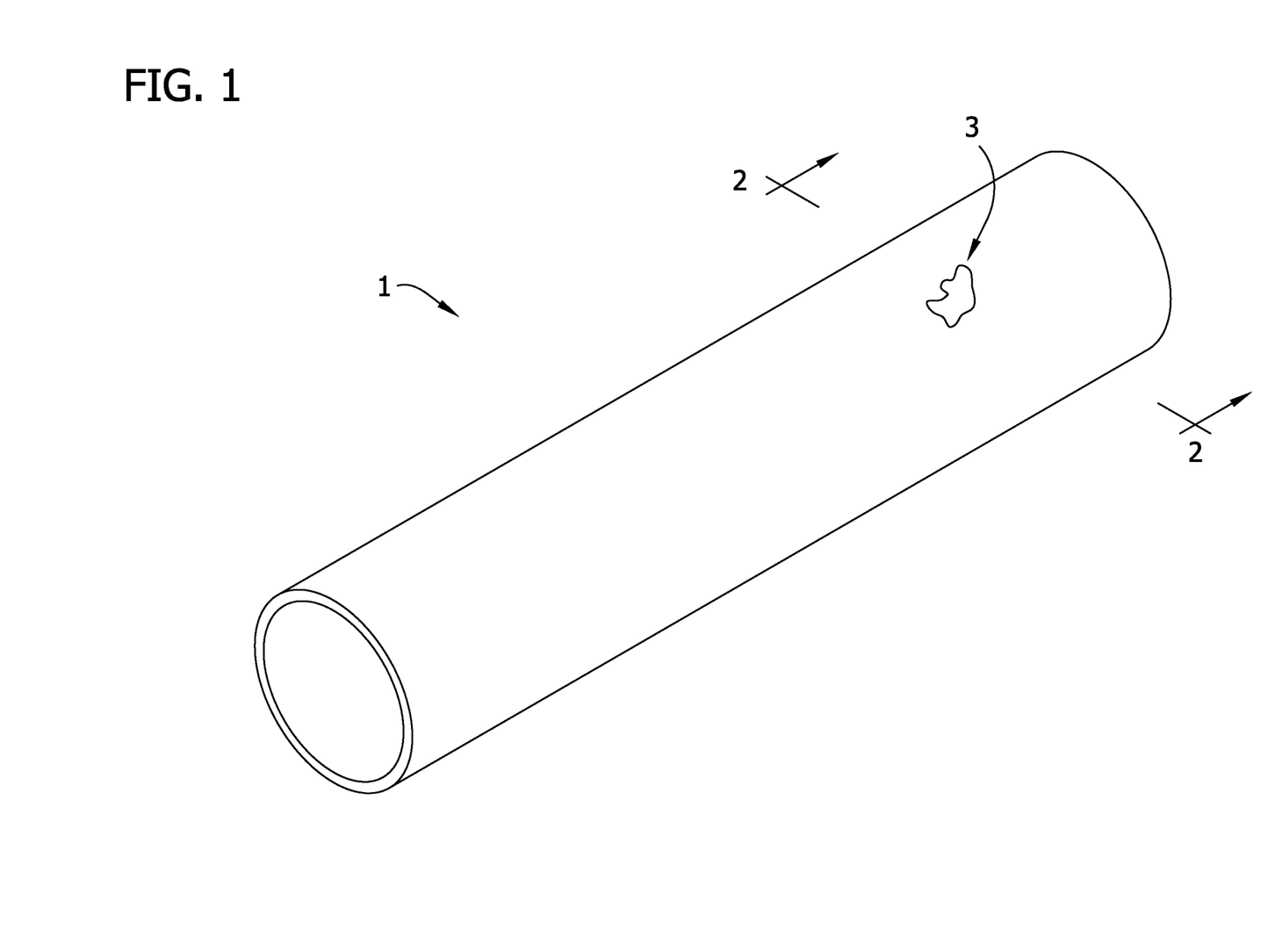
FIG. 1 is a perspective of a pipe having an opening in a side wall thereof.

Referring now to the drawings, a pipe 1 in need of repair shown schematically in FIG. 1 has a side wall hole or opening 3 caused by damage to the pipe. Although not illustrated, the pipe 1 is located underground where groundwater may pass into the pipe 1 through the opening 3. The size of the opening 3 is shown large for ease of visualization, but need not be as large as shown to permit undesired infiltration of groundwater into the pipe. For example, an opening, hole or breach may be no more than a crack or pinhole that extends through the side wall of the pipe allowing groundwater to pass into the interior of the pipe. Dirt and other debris may also flow into the pipe through the opening 3. In order to repair the entire pipe 1, such as by applying a fiber reinforced polymer to the interior walls of the pipe, it is desirable to stop groundwater infiltration prior to carrying out the full repair.

Repair of the opening 3 in the pipe 1 may be temporary until a more universal repair of the pipe is accomplished, or could be a longer term repair. According to a process of the present invention, a portion of the internal wall of the pipe 1 around the opening 3 is prepared for bonding in a suitable manner. For example, the internal wall portion is conditioned to facilitate bonding of a material to the wall with an epoxy or other suitable adhesive. Other portions of the pipe near the opening 3 are not required to be finished. In one embodiment, the internal wall portion is brought to a near white finish. This may be accomplished by abrasive blasting, mechanical grinding, hand sanding or by other suitable processes or combination of processes. The materials used to accomplish the finish of the internal wall portion may be broadly referred to as "abraders." The internal wall portion is then roughened and then cleaned. Surface roughening can be carried out by hand or with other mechanical assistance. For example, roughening can be achieved using high pressure water blasting, sand blasting, with a grinding wheel, wire brush or by other suitable techniques. Surface cleaning can be as simple as wiping with rags, vacuuming or broom cleaning. In other embodiments, solvents may be used or other special chemicals when, for example, reduction of chlorides or other contaminants is needed. Prior to conditioning the internal wall portion surrounding the opening 3, a stopgap seal of the opening may be employed. For example conformable materials may be forced by hand into the opening to achieve a momentary stoppage of infiltration.

After the internal wall portion surrounding the opening 3 is cleaned and dry, a prime coat of adhesive is applied to the internal wall portion. For example an epoxy may be used. Preferably, the epoxy should be one that forms a liquid barrier at least in any interstices of a fabric to which is it applied for use in forming an unbroken liquid barrier. The epoxy also needs to prevent liquid from moving laterally across the fabric, which could result in leakage around the fabric. One example of a suitable epoxy is Tyfo® S epoxy available from Fyfe Co. LLC of San Diego, Calif. However, it will be understood that other suitable materials could be used within the scope of the present invention.

A first piece of fabric 5 capable of holding a hardening or curable material is sized in relation to the size of the opening 3 to cover the opening, but is not sized for lining the entire pipe. In most cases, that means the first piece of fabric 5 is sized much smaller than the circumference of the pipe at the location of the opening 3. After the prime coat is applied, the first fabric piece 5 is applied over the opening 3 and against the internal wall portion next to the opening on the prime coat. Preferably the application occurs while the prime coat is still tacky. In one embodiment, the fabric is a fiber ladened woven fabric or chopped strand mat of glass fibers or other suitable fibrous materials (e.g., carbon fibers, basalt fibers, aramid fibers, ultra-high molecular weight polyethylene fibers, or other, preferably non-conductive fibers, etc.). A suitable multi-axial fabric comprises a woven fabric. In one or more embodiments, the woven fabric is a bi-directional woven fabric with warp and weft fibers generally oriented perpendicular to one another (e.g., 0°/90°, 45°/−45°, etc.). A suitable bi-directional fabric material may include more or stronger fibers oriented in one direction (e.g., the warp direction) than the other direction (e.g., the weft direction). For purposes of the present application the direction including more and/or stronger fibers, whether warp, weft or any other orientation within the fabric material, may be referred to as the "strong direction" of the fabric material. Other bi-directional materials include substantially the same amount of fibers in the warp and weft directions without departing from the scope of the invention. In a preferred embodiment of a woven multi-axial fabric, the fabric sheet 5 has a satin or twill weave. For example, a suitable weave is one in which the weft floats or skips over as many as 12 warps before being woven in to the weave. The next pick repeats the float, but on a different set of warps. Generally the material will be at least minimally conformable to the surface (e.g., the interior of a pipe) to which it is applied. However, "conformable" includes semi-rigid materials. Preferably, the material is configured to hold at least some hardenable material in such a fashion that the hardenable material (e.g., epoxy) can fill in any void spaces in the fabric. The fabric can be treated with a sizing to improve the bond of the glass fiber to the epoxy. One example of a suitable material is Tyfo® WEB reinforcing fabric available from Fyfe Co. LLC of San Diego, Calif. Tyfo® WEB reinforcing fabric is a satin woven glass fabric in which each weft bundle of glass fibers floats over three adjacent warp bundles of glass fibers. Materials of this construction have good resistance to penetration by liquids.

The first fabric piece 5 is impregnated (e.g., saturated) with a hardenable polymer or other hardenable material to form a fiber reinforced composite. Preferably, the fabric 5 is impregnated such that the hardenable material fills substantially all of the void spaces in the fabric. In a preferred embodiment, the first fabric piece 5 is impregnated prior to being placed against the internal wall portion surrounding the opening 3. However, the fabric piece 5 could be placed against the primer coat on the internal wall portion dry and then impregnated within the scope of the present invention. In a still further embodiment, the fabric piece 5 may not be impregnated with resin at any point in the process. One example of a suitable hardenable polymer is an epoxy. One such epoxy is Tyfo® S epoxy available from Fyfe Co. LLC of San Diego Calif. Use of Tyfo® S epoxy as both the primer coat and the hardenable polymer has been found effective. However, it will be appreciated by those of ordinary skill in the art that different materials may be used for the primer coat and for the hardenable polymer within the scope of the present invention.

Figure 2:
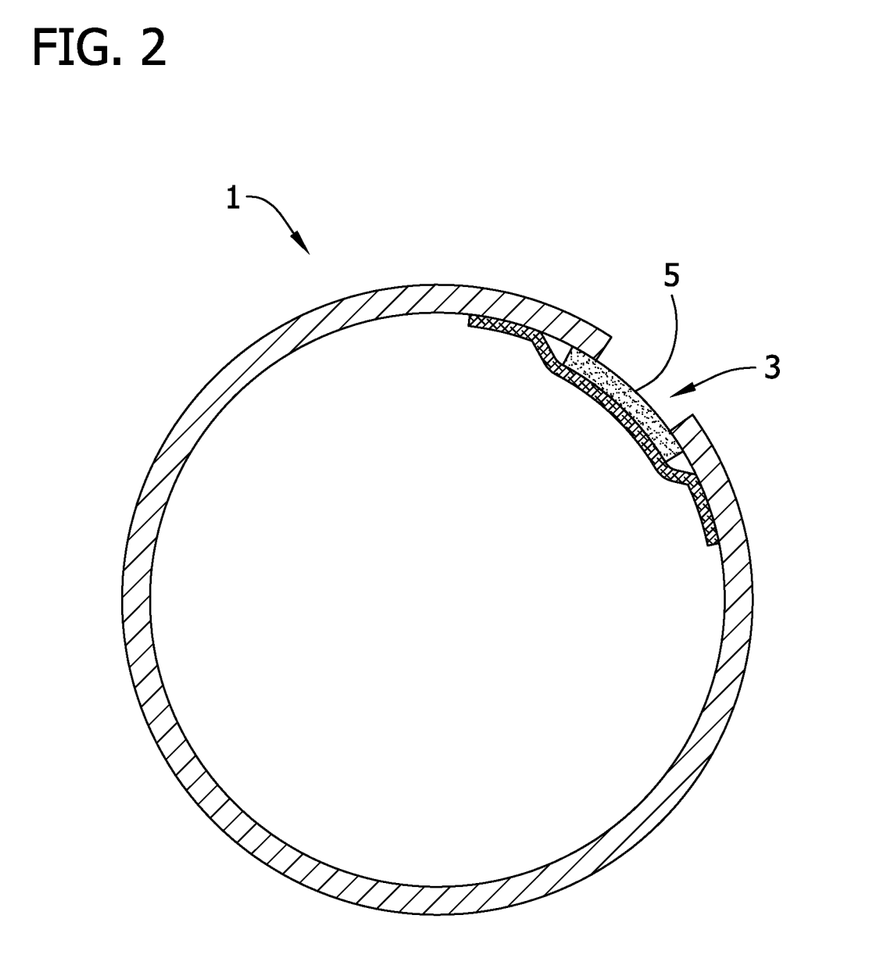
FIG. 2 is an enlarged section taken in the plane including line 2-2 of FIG. 1 and schematically illustrating a repair of the pipe opening according to the principles of the present invention.

As illustrated in FIG. 2, a second fabric piece 7 is placed over the first fabric piece 5 and against the primer coat on the internal wall portion surrounding the opening 3. The second fabric piece 7 can be the same material as the first fabric piece 5, or be a different material. The second fabric piece 7 can be impregnated with the same or a different hardenable polymer and then applied to the first fabric piece 5 and primer coat. It is also possible to apply the second fabric piece 7 in an unimpregnated or dry condition to the first fabric piece 5 and then saturate the second fabric piece. In one embodiment, the first fabric piece 5 and the second fabric piece 7 are cut so that the fibers of the first piece are oriented at approximately 45° with respect to the edges of the piece and the fibers of the second piece are oriented at 90° with respect to the edges. For example, when the first and second fabric sheets 5, 7 are each 90° bi-directional woven fabrics, the second fabric sheet can be applied to the first fabric sheet so the fibers in the second fabric sheet are oriented transverse (e.g., at an angle of about 45°) with respect to the fibers of the first fabric sheet. It will be understood that the second piece 7 may be omitted without departing from the scope of the present invention. Moreover, additional pieces of material (not shown) may be applied. The use of two pieces with differently aligned fibers may improve the water tightness of the combined fabric pieces.

The impregnated fabric pieces 5, 7 can be allowed to cure in the air or more rapidly cured using heat, UV or other curing stimulant. As cured, the epoxy and fabric pieces 5, 7 provide a strong and liquid tight covering for the opening 3, preventing further infiltration of groundwater into the pipe 1. This allows a more universal repair of the pipe 1 to be carried out in optimum (e.g., dry) conditions conducive to the best overall repair result. For example, other pieces of curable materials (not shown) may be applied to the internal or external walls of the pipe 1 in such a manner as to completely line the interior of the pipe. An example of a suitable system for overall repair of the pipe is shown in U.S. Pat. No. 5,931,198. This material can be applied over the fabric pieces 5, 7. It is also possible to form material into a tube and drag or evert the tube into the pipe 1. The tube of material can be impregnated with a hardenable polymer and cured in the pipe in manner well known to those of ordinary skill in the art.

Figure 3:
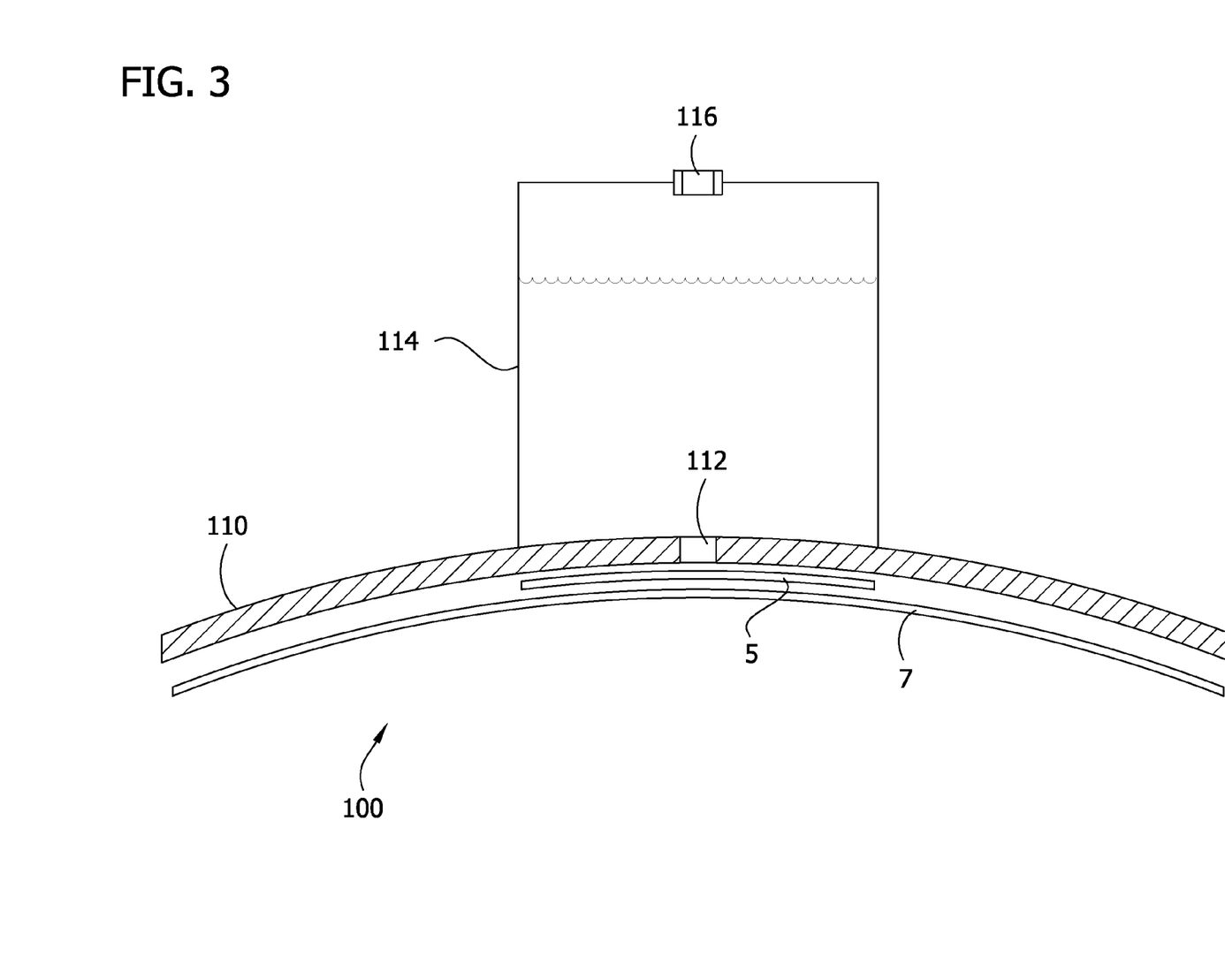
FIG. 3 is a schematic cross section of a test system for testing a pipe repair.
Figure 4:
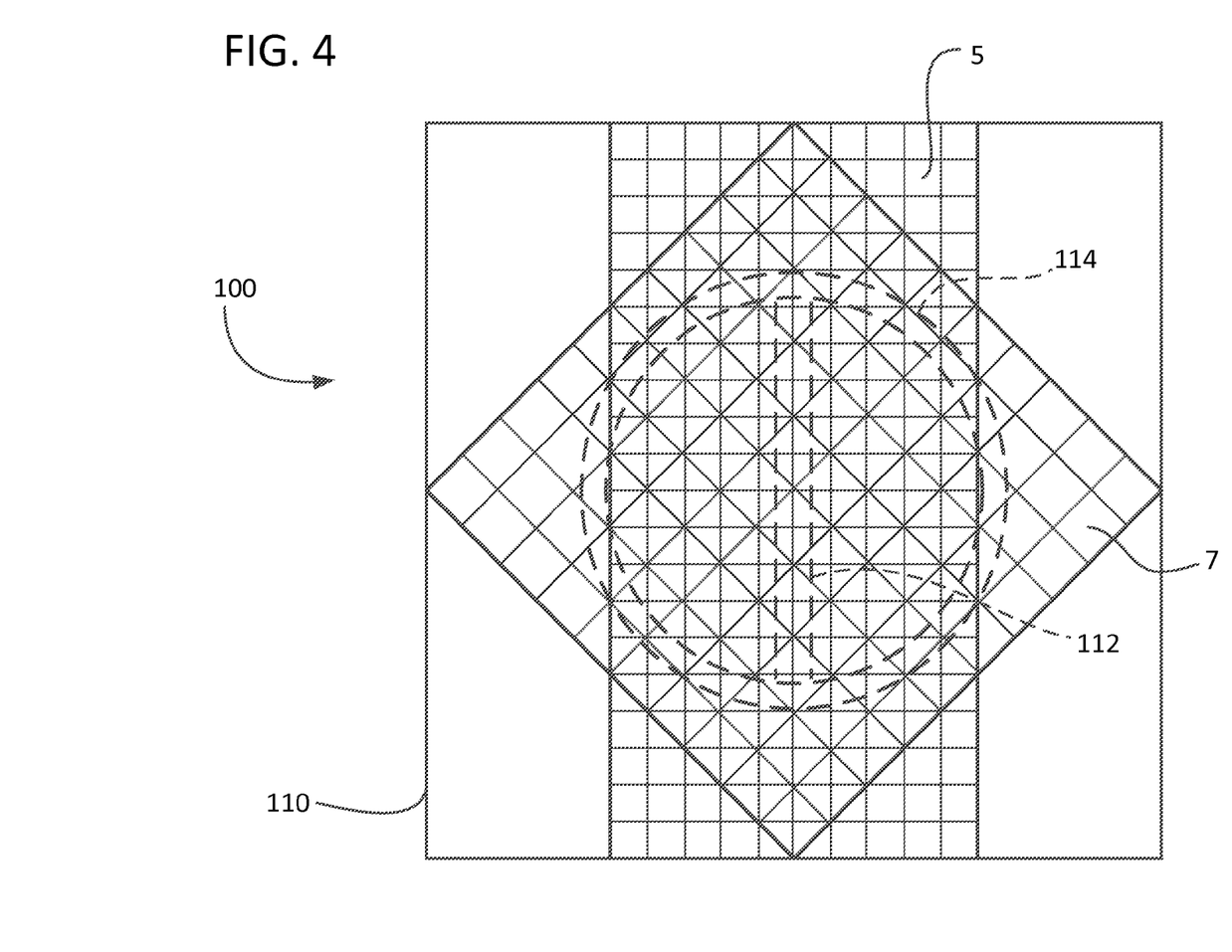
FIG. 4 is a schematic bottom plan view of the test system with certain upper features of the test system illustrated in phantom.

Referring to FIGS. 3 and 4, a test of a system for evaluating the effectiveness of a liquid tight covering placed over an opening in a side wall of a pipe is generally indicated at reference number 100. Several test systems 100 were used to test the effectiveness of one exemplary embodiment of a liquid tight covering configured to be placed over an opening in a pipe wall. After briefly describing the test system 100 and how it was used during testing, the results will be described below.

Each test system 100 includes a generally square steel plate 110, which is designed to function like the wall of the pipe 1. The plate 110 has a length and width of about 12 inches (about 30.48 cm), respectively, and a thickness of about 0.375 inches (about 0.953 cm). A test slot 112, which is configured to function like a relatively large void in the wall of the pipe 1, extends through the thickness of the plate 110. The slot 112 has a length of about 6 inches (about 15.24 cm) and a width of about 0.75 inches (about 1.905 cm). The plate 110 is secured by a liquid tight connection to one end of a cylinder 114 so that the slot 112 is fluidly coupled to the interior of the cylinder. The cylinder has in interior diameter of about 6 inches (about 15.24 cm) and is arranged relative the plate 110 so that the slot 112 is centered diametrically at one end of the cylinder interior. The cylinder 114 is adapted to be at least partially filled with water and includes a compressed air fitting 116 opposite the plate 110.

Having described the structure of the illustrated test system 100, the steps testing technicians performed to construct suitable coverings over the slots 112 of six test systems 100 and to test the liquid tightness of the coverings will now be briefly described. Before placing the covering over each of the slots 112, the technicians prepared the surfaces of the plates 110 opposite the cylinders 114 and applied prime coats of Tyfo® S epoxy. For each of the six test systems 100, the technicians cut a first rectangular shaped piece 5 of Tyfo® Web fabric to a length of about 12 inches (about 30.48 cm) and a width of about 6 inches (about 15.24 cm). While the prime coat was still tacky, the technicians impregnated the first pieces of fabric 5 with Tyfo® S epoxy and applied each to a respective plate 110 in a centered position in which the longitudinal ends of the sheet were substantially aligned with opposite sides of the plate and the length of the fabric sheet was oriented substantially parallel to the length of the slot 112. In this position, the fabric sheet 5 completely covered the slot 112. The fibers in the piece of fabric 5 are arranged so as to intersect the sides of the sheet at an angle of about 90°. The piece of fabric 5 is applied over the slot 112 so that the fibers make an angle of 90° with respect to a longitudinal axis of the slot. The technicians also cut a second, substantially square sheet fabric sheet of Tyfo® Web fabric 7 measuring about 12 inches (about 30.48 cm) between opposite corners. The technicians impregnated the second pieces with Tyfo® S epoxy and subsequently applied each to a respective plate 110 in a centered position in which the corners of the sheet were substantially aligned with the sides of the plate. As applied to the plates 110, the second pieces of fabric 7 substantially covered the slots 112. The fibers of the second piece of fabric 7 are oriented at right angles with respect to the edges of the piece of fabric. As applied to the plate 110, the bidirectional fibers of the fabric 7 make angles of ±45° with respect to the longitudinal axis of the slot 112. The piece of fabric 7 was applied so that the direction in which the fibers are strongest is oriented at 45° with respect to the direction in which the fibers are strongest in the piece of fabric 5. After applying the first and second pieces of fabric 5, 7 to each plate, the epoxy was allowed to cure at ambient conditions for a minimum of 72 hours. Once the epoxy cured, the pieces of fabric 5, 7 formed an exemplary liquid tight covering over the slot 112.

After the coverings were applied over the slots 112 of each of the six test systems 100, the liquid tightness of the coverings was tested. The cylinders 114 of each of the test samples were partially filled with deionized water. The fluid inside four of the ten cylinders 114 was pressurized to an internal pressure of about 50 psi (about 345 kPa), and the fluid inside the other two cylinders was pressurized to an internal pressure of 100 psi (about 689 kPa). The technicians placed each of the test systems 110 in a holding facility for a period of 7 days. A temperature monitoring system continuously monitored the environmental temperature throughout the seven-day period, and a humidity monitoring system provided daily recordings of the humidity in the holding facility. During the seven day holding period, the patches of both the 50 psi test systems and the 100 psi test systems showed no signs of leakage. Due to environmental changes over the seven day period, the internal pressures of each of the 50 psi cylinders decreased by about 2-3 psi (about 13.79-20.68 kPa) per day and the internal pressures of each of the 100 psi cylinders decreased by about 5-7 psi (about 34.47-48.26 kPa) per day. To maintain substantially constant fluid pressures throughout the seven-day holding period, the technicians added pressure to each of the cylinders 114 on a daily basis. The results of the seven day holding period testing indicated that the coverings were substantially liquid tight at fluid pressures of about 50 psi (about 345 kPa) for a period of seven days. Likewise, the results of the seven day holding period testing indicated that the coverings were substantially liquid tight at fluid pressures of about 100 psi (about 689 kPa) for a period of seven days.

Once the seven day holding period ended, the technicians performed burst testing on each of the six test systems 100. During burst testing, the fluid pressure in each of the cylinders 114 was slowly increased until the covering over the slots 112 failed and the water contained in the cylinders escaped through the slots. The pressure at which the coverings ruptured was recorded as the burst pressure for the sample. As shown in Table 1 below, the patches provided by the first and second fabric sheets 5, 7 remained watertight up to a fluid pressure of at least about 290 psi (about 2000 kPa).

| Sample Number | Seven Day Holding Pressure - psi (kPa) | Burst Pressure - psi (kPa) |
| --- | --- | --- |
| 1 | 50 (345 kPa) | 401 (2,765) |
| 2 | 50 (345 kPa) | 447 (3,082) |
| 3 | 50 (345 kPa) | 293 (2,020) |
| 4 | 50 (345 kPa) | 315 (2,172) |
| 5 | 100 (689 kPa) | 431 (2,972) |
| 6 | 100 (689 kPa) | 488 (3,365) |

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the inventions have been disclosed in the context of certain embodiments and examples, it will be understood by those skilled in the art that the inventions extend beyond the specifically disclosed embodiments to other alternative embodiments and/or uses and obvious modifications and equivalents thereof. Accordingly, it is not intended that the inventions be limited, except as by the appended claims.

What is claimed is:

1. A method of repairing a section of a pipe including a breach in the pipe, the method comprising:
 preparing an internal surface of a wall of the pipe generally around the breach;
 sizing a piece of conformable material of the type capable of carrying a curable polymer in relation to a size of the breach;
 applying the sized piece of conformable material to the prepared internal surface so that the breach is covered by the piece of conformable material;
 impregnating the piece of conformable material with a curable polymer; and
 curing the curable polymer within the piece of conformable material thereby to seal the breach against egress of groundwater into the pipe;
 wherein the piece of conformable material comprises a first piece of conformable material and the method further comprises applying a second piece of conformable material of the type capable of carrying a curable polymer over the applied first piece of conformable material; and
 wherein each of the first and second pieces of conformable material have fibers arranged to give the piece of conformable material a greater strength in a strong direction, and the strong directions of the first and second pieces of conformable material are transverse to each other.

2. The method of claim 1 wherein the step of impregnating the first piece of conformable material occurs prior to the step of applying the first piece of conformable material to the prepared surface.

3. The method of claim 1 further comprising applying a primer coat material to the prepared surface and over less than the entire circumference of the pipe at the location of the breach prior to applying the conformable material to the prepared surface.

4. The method as set forth in claim 3 wherein a circumferential segment of the section of the pipe that is aligned along a length of the section of the pipe with the breach and spaced apart circumferentially from the breach is substantially free of primer coat material after each of the steps of applying the primer coat, applying the first and second pieces of sized woven fibrous material, and curing the curable polymer.

5. The method of claim 1 wherein the first piece of conformable material comprises fiber ladened woven mat.

6. The method of claim 1 further comprising lining the entire section of pipe including the sealed breach.

7. The method as set forth in claim 6 wherein the step of lining the entire section of pipe comprises covering internal surfaces of the first and second pieces of conformable material with the liner such that no portion of either of the pieces of conformable material is exposed to an interior of the pipe after the liner is installed.

8. A method of repairing a section of a pipe including a breach in the pipe, the method comprising:
 preparing a surface of a wall of the pipe generally around the breach;
 sizing first and second pieces of woven fibrous material of the type capable of carrying a curable polymer in relation to a size of the breach, each of the first and second pieces of woven fibrous material having fibers arranged to give the respective piece of woven fibrous material a greater strength in a single strong direction;
 applying the first piece of sized woven fibrous material to the prepared surface so that the breach is covered by the first piece of woven fibrous material and the single strong direction of the first piece of sized woven fibrous material has a first orientation;
 applying the second piece of sized woven fibrous material to the applied first piece of woven fibrous material so that the breach is covered by the second piece of woven fibrous material and the single strong direction of the second piece of woven fibrous material has a second orientation different from the first orientation such that the single strong direction of the second piece of woven fibrous material is oriented transverse to the single strong direction of the first piece of woven fibrous material;
 impregnating the first and second pieces of woven fibrous material with a curable polymer; and
 curing the curable polymer within the first and second pieces of woven fibrous material thereby to seal the breach against egress of groundwater into the pipe.

9. The method of claim 8 wherein the step of impregnating the first and second pieces of woven fibrous material occurs prior to the step of applying the first and second pieces of sized woven fibrous material to the prepared surface.

10. The method of claim 8 further comprising applying a primer coat material to the prepared surface along less than the entre circumference of the section of pipe prior to applying the first and second pieces of sized woven fibrous material; wherein a circumferential segment of the section of the pipe that is aligned along a length of the section of the pipe with the breach and spaced apart circumferentially from the breach is substantially free of primer coat material after each of the steps of applying the primer coat, applying the first and second pieces of sized woven fibrous material, and curing the curable polymer.

11. The method of claim 8 further comprising lining an interior of the entire section of the pipe with a liner after applying the first and second pieces of sized woven fibrous material such that the liner completely covers the first and second pieces of woven fibrous material along the section of the pipe and no portion of either of the first and second pieces of woven fibrous material is exposed to the interior of the pipe after the liner is installed.

\* \* \* \* \*